(12) United States Patent
Hwang

(10) Patent No.: US 6,823,890 B1
(45) Date of Patent: Nov. 30, 2004

(54) WATER-INTAKE CONTROL VALVE

(76) Inventor: Biing-Yih Hwang, No. 102, Sec. 1, Fenglin Rd., Linyuan Shiang, Kaohsiung (TW)

( * ) Notice: Subject to any disclaimer, the term of this patent is extended or adjusted under 35 U.S.C. 154(b) by 0 days.

(21) Appl. No.: 10/671,829

(22) Filed: Sep. 29, 2003

(51) Int. Cl.[7] .......................... F16K 31/22; F16K 31/24
(52) U.S. Cl. ...................... 137/446; 137/443; 141/198
(58) Field of Search ................................ 137/434, 435, 137/442, 443, 445, 446; 141/198

(56) References Cited

U.S. PATENT DOCUMENTS

| | | | | |
|---|---|---|---|---|
| 267,736 A | * | 11/1882 | Young | 137/446 |
| 453,069 A | * | 5/1891 | Vosburgh | 137/442 |
| 459,044 A | * | 9/1891 | Moore | 137/446 |
| 520,150 A | * | 5/1894 | Turner | 137/446 |
| 590,558 A | * | 9/1897 | Jewett | 137/442 |
| 674,276 A | * | 5/1901 | Moore | 137/443 |
| 741,534 A | * | 10/1903 | Nichols | 137/443 |
| 3,570,527 A | * | 3/1971 | Fritz | 137/445 |
| 4,796,650 A | | 1/1989 | Hwang | 137/443 |

* cited by examiner

Primary Examiner—George L. Walton
(74) Attorney, Agent, or Firm—Troxell Law Office PLLC

(57) ABSTRACT

A water-intake control valve including an upper valve base, a lower valve base, a valve tappet and a ball connect rod. The upper valve base is combined with the lower valve base to form a valve chamber with a sealing neck. The valve tappet is movably disposed inside the valve chamber. The valve tappet connects with a slide block and a valve stopper for sealing the sealing neck. The slide block linearly moves along a guiding slot hole of the lower valve base. On one end of the ball connect rod is mounted with a float ball and on another end of the ball connect rod is formed with a degressive arc end. The degressive arc end passes through the guiding slot hole and the through hole of the slide block to pull or push the slide block for linearly moving the valve tappet.

11 Claims, 8 Drawing Sheets

WATER-INTAKE CONTROL VALVE

FIELD OF THE INVENTION

The present invention is relating to a water-intake control valve equipped on a water-storage station for automatically supplying and sealing water.

BACKGROUND OF THE INVENTION

Conventionally, water-storage stations such as water tower, cultural water-storage pond, is equipped with a water-intake control valve for automatically supplying water while lacking water. Such conventional water-intake control valve has various control structures. As disclosed in U.S. Pat. No. 4,796,650 entitled "structure for a float valve assembly", a conventional float valve includes a valve body and a float rod connecting with a float ball. The float rod has a first tooth disc face on another end to engage with a moving member of a second tooth disc face. The moving member has an extending foot, which is inserted into a rectangular hole of a cap. The cap is combined with a resisting disc in a valve body. According to the change of water surface the float rod and moving member will move to open and close the outlet of the valve body with the resisting disc, but uneasy to control the resisting disc which moves linearly to automatically control supplying or sealing water.

SUMMARY

The primary object of the present invention is to provide a water-intake control valve, which utilizes a slide block with a through hole connected at one end of a valve tappet to linearly move along a guiding slot hole of a valve base. A ball connect rod has a degressive arc end passing through the through hole of the slide block to pull or push the slide block for linearly moving the valve tappet. When the float ball pushs the ball connect rod due to the change of water surface, the moving force of the ball connect rod is transformed to linearly move the slide block and the valve tappet so as to close or open the control valve more effectively and certainly.

The secondary object of the present invention is to provide a water-intake control valve, which utilizes a valve tappet connected with a valve stopper to seal or open the sealing neck of control valve. At one end of the valve tappet is connected with a slide block which is driven by the ball connect rod. At another end of the valve tappet is fixed with a water-blocking cap. The water-blocking cap moves simultaneously with the valve stopper as one unit for balancing water pressure during supplying and sealing water so as to prevent large water-intake pressure from impacting the valve stopper causing an improper opening or sealing operation.

According to the present invention, the water-intake control valve comprises an upper valve base, a lower valve base, a valve tappet and a ball connect rod. The upper valve base has a water-intake opening, a water-outtake opening and a balance opening. The lower valve base is assembled with the upper valve base to construct a valve chamber with a sealing neck. Advantageously, the sealing neck is formed in the upper valve base. The lower valve base has a joint ring, a pivoting salient and a plurality of water-outlets between the joint ring and the pivoting salient. The joint ring is connected with the water-outtake opening of the upper valve base and the pivoting salient has a guiding slot hole. The valve tappet is fixed with a valve stopper for sealing the sealing neck and is movable back and forth inside the valve chamber. A slide block with a through hole is united at one end of the valve tappet. The ball connect rod possesses a float connecting end, a degressive arc end and a pivoting portion between the float connecting end and the degressive arc end. It is better that the degressive arc end has a tail end with a gradually enlarging radian. The pivoting portion of the ball connect rod is united with the pivoting salient of the lower valve base. The degressive arc end passes through the guiding slot hole and the through hole of the slide block for driving the slide block to linearly move along the guiding slot hole following the movement of the ball connect rod for leading the valve stopper to obstruct or open the sealing neck. Preferably, a water-blocking cap is fixed at another end of the valve tappet and simultaneously moves with the valve stopper as one unit so as to balance water pressure during supplying or closing water.

DETAILED DESCRIPTION OF THE PRESENT INVENTION

Figure 1:
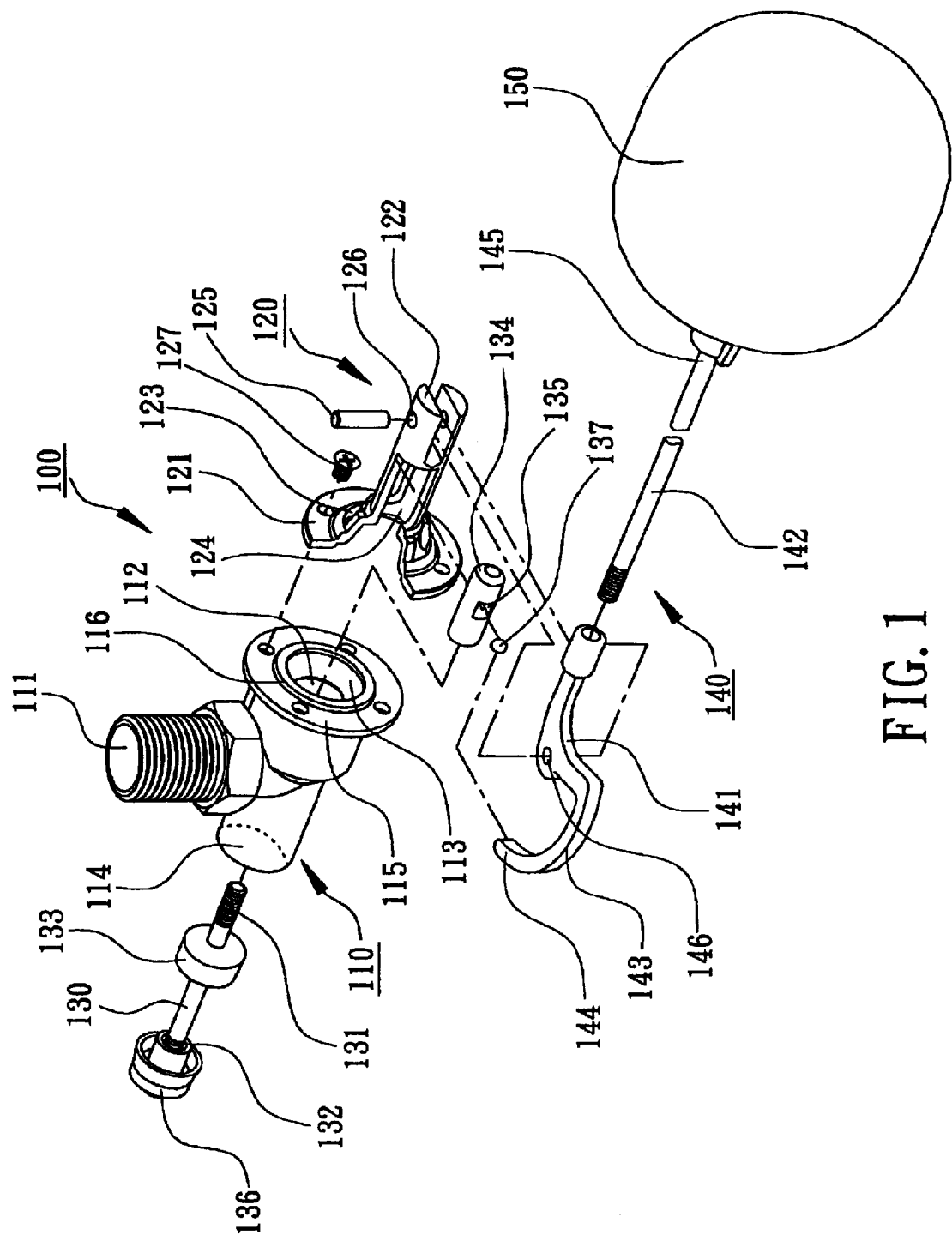
FIG. 1 is an exploded view of a water-intake control valve in accordance with the first embodiment of the present invention.

Referring to the drawings attached, the present invention will be described by means of the embodiments below.

Figure 2:
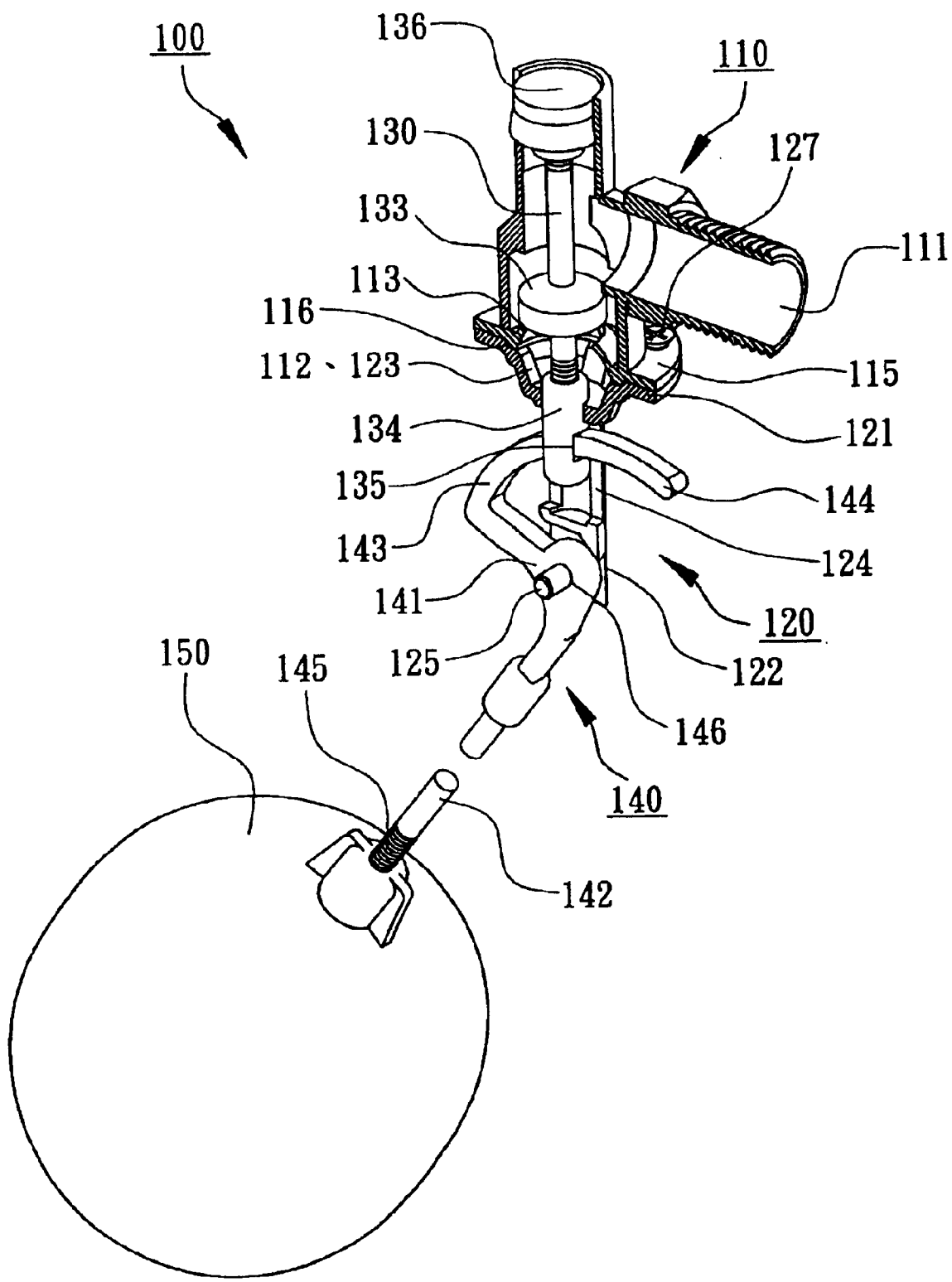
FIG. 2 is a perspective view of the water-intake control valve in state of supplying water in accordance with the first embodiment of the present invention.
Figure 3:
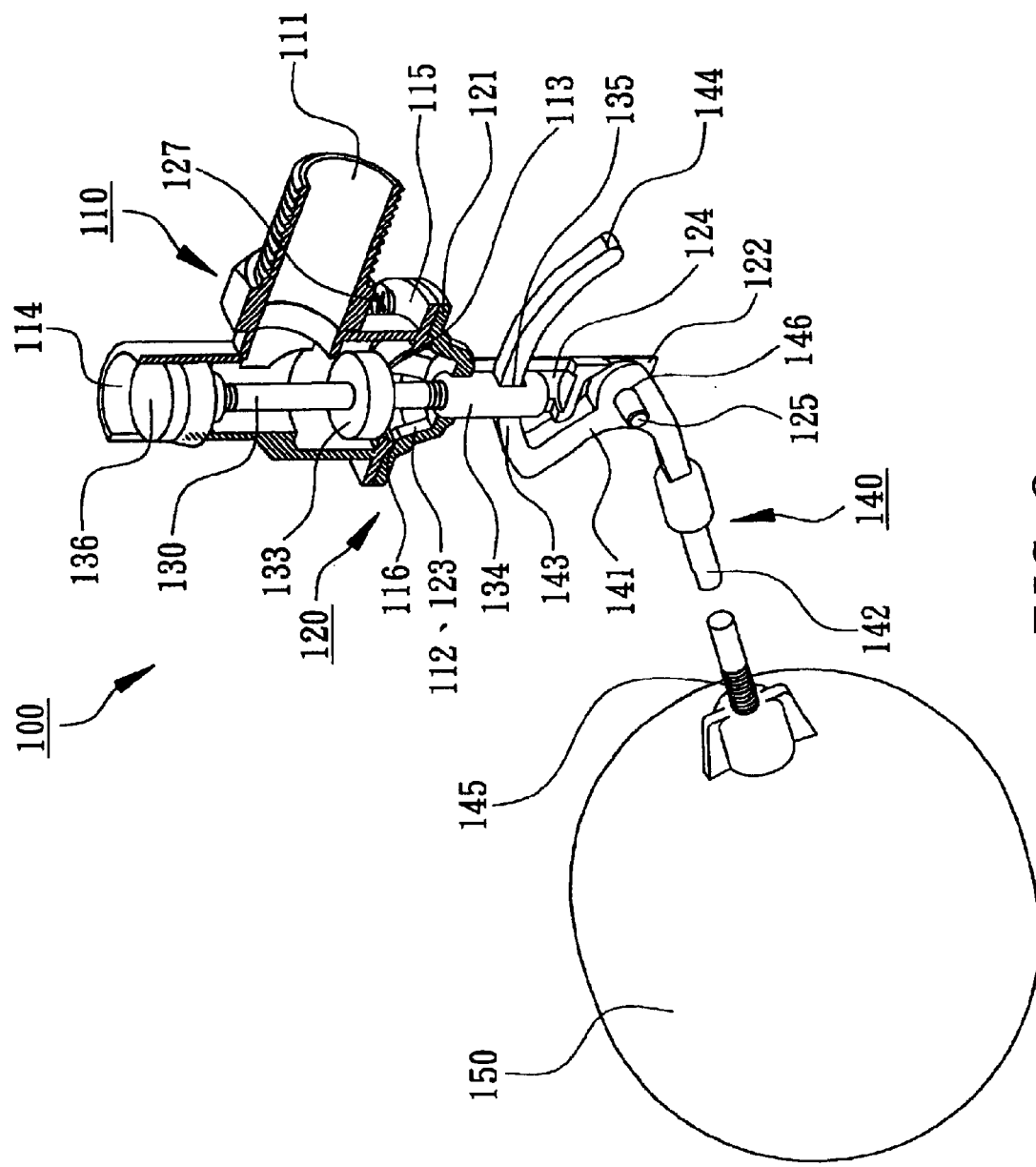
FIG. 3 is a perspective view of the water-intake control valve in state of closing water in accordance with the first embodiment of the present invention.

According to the water-intake control valve of the first embodiment of the present invention as showed in FIGS. 1, 2 and 3, a control valve 100 mainly includes an upper valve base 110, a lower valve base 120, a valve tappet 130 and a ball connect rod 140. The upper valve base 110 is assembled with the lower valve base 120 to form a valve chamber. The upper valve base 110 has a water-intake opening 111, a water-outtake opening 112 and a balance opening 114. The valve chamber with a caliber-reduced sealing neck 113 (referring to FIGS. 2 and 3) is formed. A valve tappet 130 is movably disposed inside the valve chamber. The valve tappet 130 is connected with a valve stopper 133 corresponding to the sealing neck 113, and is connected with a water-blocking cap 136 corresponding to the balance opening 114. Normally, the sealing neck 113 (referring to FIGS. 2 and 3) is set at the inner edge of the water-outtake opening 112 of the upper valve base 110 for supplying or sealing water as a switching portion. A joint ring 115 is formed at the outer ring of the water-outtake opening 112 of the upper valve base 110 for uniting with the lower valve base 120. It is preferable that a protruding edge 116 can be formed at the joint ring 115 for enabling the upper valve base 110 to position and combine with the lower valve base 120. In this embodiment, the water-outtake opening 112 linearly corresponds to the balance opening 114 but not to the water-intake opening 111.

The lower valve base 120 is assembled with the upper valve base 110 to form the valve chamber with a sealing neck 113. The lower valve base 120 has a joint ring 121, a pivoting salient 122 and a plurality of water-outlets 123 between the joint ring 121 and the pivoting salient 122. The joint ring 121 of the lower valve base 120 is positioned to and connected with the joint ring 115 of the upper valve base 110 by bolts 127, so that the upper valve base 110 and the lower valve base 120 can be assembled together to be a valve body. The pivoting salient 122 is applied to pivot with the ball connect rod 140, has a guiding slot hole 124.

The valve tappet 130 and its connected components such as valve stopper 133, slide block 134 and water-blocking cap 136 are disposed and movably equipped inside the valve chamber. The valve tappet 130 has a first end 131 and a second end 132. The valve stopper 133 is fixed between the first end 131 and the second end 132 for obstructing the sealing neck 113. The slide block 134 with a through hole 135 which can linearly move along the guiding slot hole 124 in the lower valve base 120 is set at the fist end 131 of the valve tappet. The through hole 135 corresponding to the guiding slot hole 124 is slanted for passing through the degressive arc end 143 of the ball connect rod 140. Preferably, the through hole 135 of the slide block 134 has an inner guiding trench for accommodating a roll ball 137. The roll ball 137 is advantage for sliding the degressive arc end 143 of the ball connect rod 140. The water-blocking cap 136 which is set at the second end 132 of the valve tappet 130 is an inner recess cap made of rubber. The water-blocking cap 136 can move in the valve chamber near to the balance opening 114 for radially sealing the balance opening 114 of the upper valve base 110. During supplying water, the water-blocking cap 136 closes the balance opening 114 and moves between the balance opening 114 and the water-intake opening 111 so that pressure of water flow from the water-intake opening 111 to the water-outtake opening 112 through the sealing neck 113 will evenly force on the valve stopper 133 and the balance opening 114 to balance the movement of the valve stopper 133.

In this embodiment, the ball connect rod 140 is composed of a pivoting rod 141 with a degressive arc end 143 and a float connecting rod 142. The float connecting rod 142 has a float connecting end 145 so as to mount with a float ball 150 such as a hollow plastic ball. The pivoting rod 141 has a rotatable pivoting portion 146 such as a pivoting hole. The pivoting portion 146 is pivoted with the pivoting hole 126 of the pivoting salient 122 of the lower valve base 120 by a joint bolt 125. The degressive arc end 143 has a gradually changing internal diameter, preferably has an arc tail end 144 with a gradually enlarging radian. The degressive arc end 143 passes through the guiding slot hole 124 and the through hole 135 of the slide block 134, so that the slide block 134 following ball connect rod's 140 movement may move straightly up and down along the guiding slot hole 124 for leading the valve stopper 133 to open or obstruct the sealing neck 113.

Figure 4:
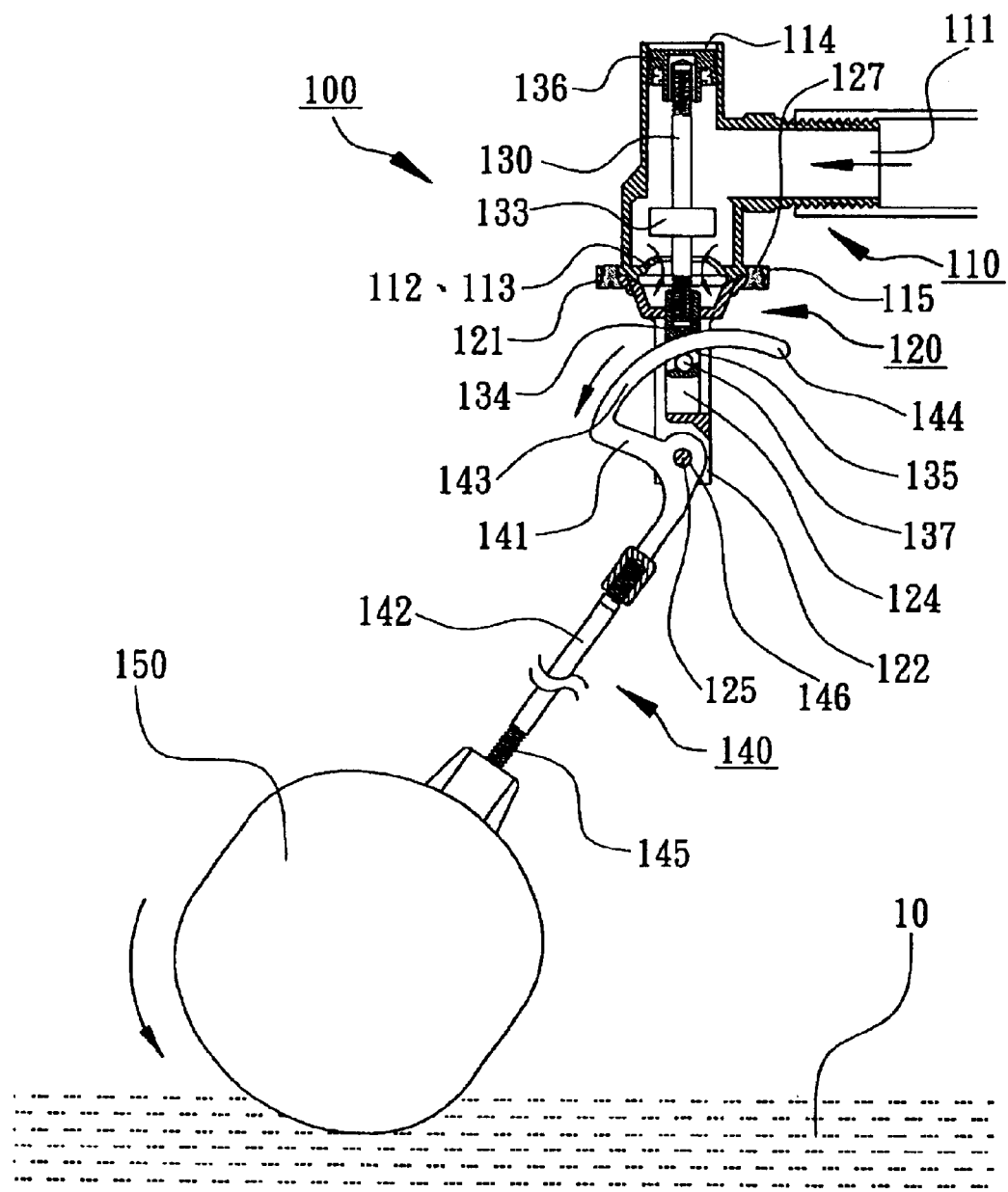
FIG. 4 is a cross sectional view of the water intake control valve in state of supplying water in accordance with the first embodiment of the present invention.
Figure 5:
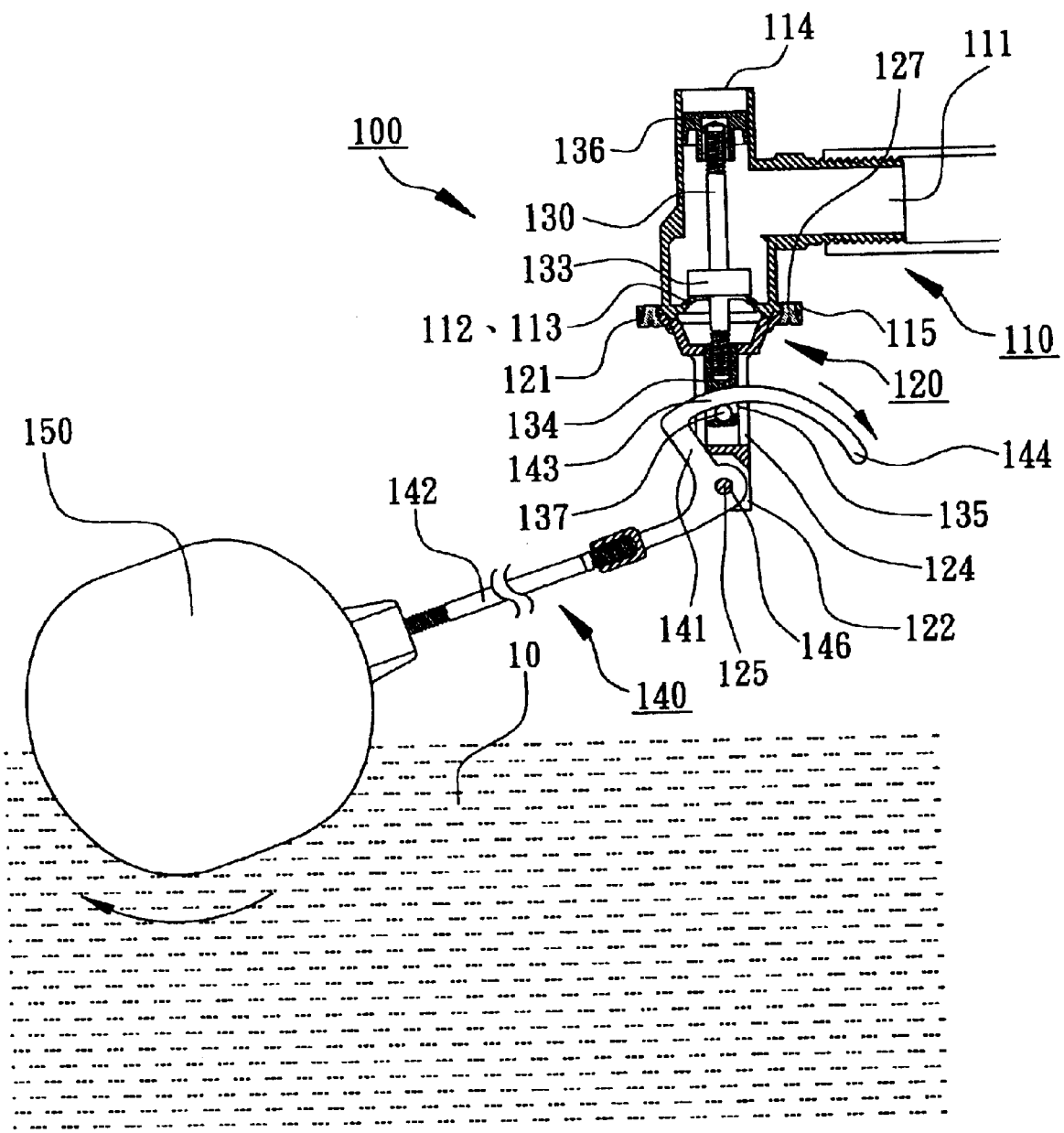
FIG. 5 is a cross sectional view of the water-intake control valve in state of closing water in accordance with the first embodiment of the present invention.

In relating to the operation of foregoing control valve 100 referring to FIGS. 4 and 5, as showed in FIG. 4, when the water level 10 descends the control valve 100 equipped in the water-storage station will start working. Initially, the float connecting end 145 of the ball connect rod 140 moves downward following the float 150 falling by gravity. Then, the contacting portion in which the degressive arc end 143 of the ball connect rod 140 contacts with the through hole 135 of the slide block 134 moves from inner edge to the tail end 144 thereof, and pushes the slide block 134 going up because that the tail end 144 has a larger radian than inner edge does. When the slide block 134 moves upward, the valve tappet 130 with a valve stopper 133 also moves upward synchronously to make the valve stopper 133 be pushed away from the sealing neck 113 so as to supply water. Finally, the water fills in from the water-intake opening 111 of the upper valve base 110 and then passes through the sealing neck 113 and flow out from the plurality of water-outlets of the lower valve base 120 for supplying water.

As showed in FIG. 5, while supplying water completely, the water level 10 ascends to a preset full water level and the float ball 150 also rises to lead the ball connect rod 140 to rotate. Then, the contacting portion in which the degressive arc end 143 of the ball connect rod 140 contacts with the through hole 135 of the slide block 134 moves from the tail end 144 to the inner edge thereof, and pulls the slide block 134 going down because that the inner edge has a smaller radian than the tail end 144 does. When the slide block 134 moves downward, the valve tappet 130 with a valve stopper 133 also moves downward synchronously to make the valve stopper 133 seal the sealing neck 113 so as to stop supplying water. Therefore, the control valve 100 of the present invention utilizes that the slide block 134 is passed through by the degressive arc end 143 and can linearly move along the guiding slot hole 124 in the lower valve base 120 to make the rotating force of the ball connect rod 140 be transformed to a linear movement (up and down) of the valve tappet 130 for sealing or opening the sealing neck 113 more effectively and certainly.

Besides, the control valve of the present invention utilizes that the inner recess cap of the water-blocking cap 136 can move inside the valve chamber near to the balance opening 114 and radially seal the balance opening 114 of the upper valve base 110 to offer an appropriate buffer of balancing water pressure during supplying water in order to effectively prevent the valve stopper 133 from suffering a big water pressure, resulting in some problems of improperly sealing the sealing neck 113 or reducing water-supplying quantity.

Figure 6:
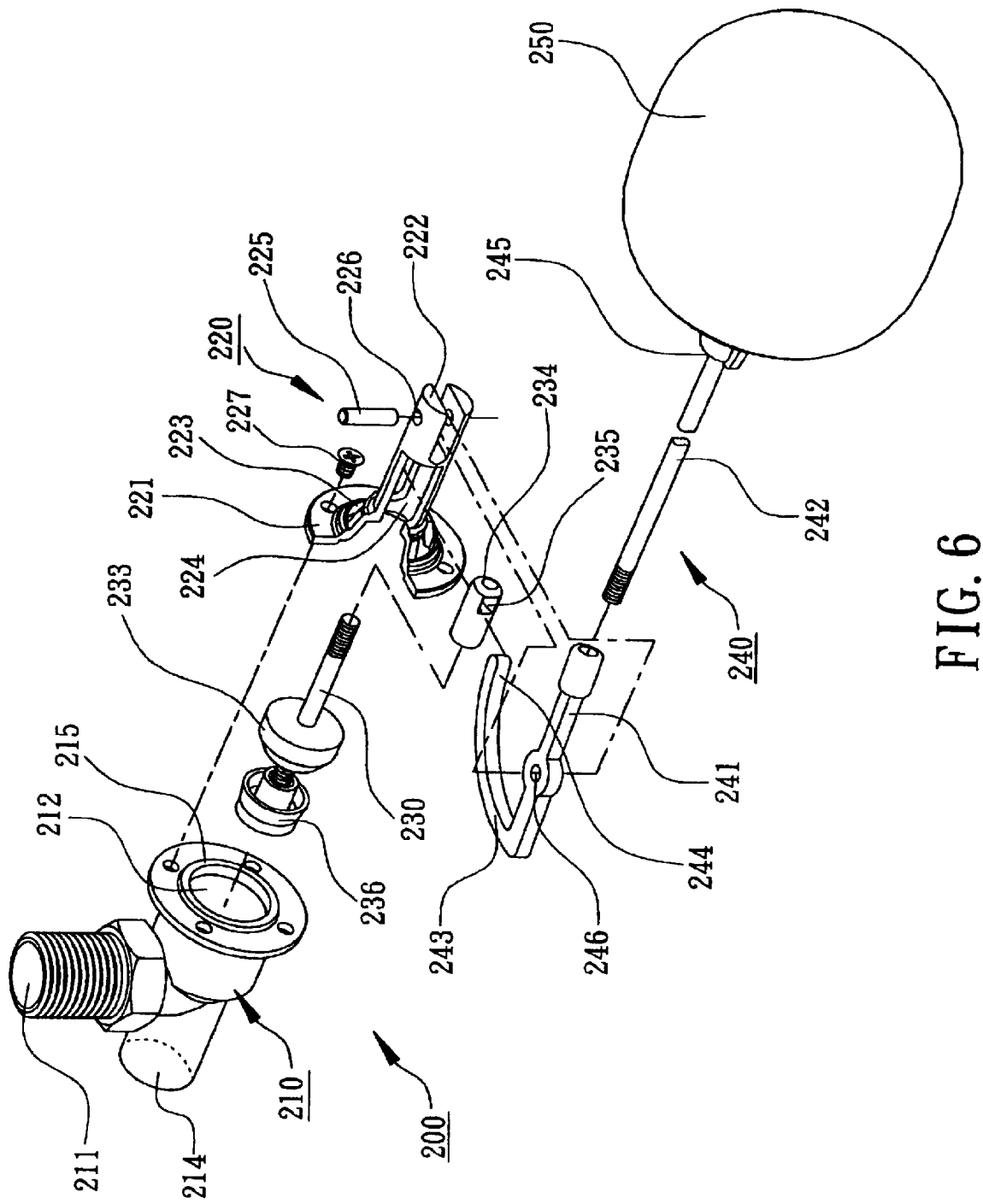
FIG. 6 is an exploded view of a water-intake control valve in accordance with the second embodiment of the present invention.

Referring to FIG. 6, the second embodiment of the present invention discloses another control valve 200 that is similar to that of the first embodiment. The control valve 200 includes an upper valve base 210, a lower valve base 220, a valve tappet 230 and a ball connect rod 240. The foregoing components of the control valve 200 of the second embodiment are approximately as same as those of the first embodiment, such as the upper valve base 110, the lower valve base 120, the valve tappet 130 and the ball connect rod 140, except the setting location of the sealing neck 213 in the valve chamber, the assembling method of the valve stopper 233 and the bending angle of the ball connect rod 240 are different. The upper valve base 210 has a joint ring 215 set at the outer ring of the water-outtake opening 212 for combining the lower valve base 220 by the bolts 227. It is better that a protruding edge 215 can be formed at the joint ring 215 for enabling the upper valve base 210 and the lower valve base 220 to be positioned and assembled together so as to form a valve chamber with a sealing neck 213. The valve chamber is located among the water-intake opening 211, the water-outtake opening 212 and the balance opening 214 of the upper valve base 210, and accommodates the valve tappet 230 with a valve stopper 233 and a water-blocking cap 236 which are assembled with the valve tappet 230 together to move synchronously. Furthermore, according to a different design about the ball connect rod 240, the sealing neck 213 is set above the valve stopper 233 near the water-intake opening 211 (referring to FIGS. 7 and 8) as a switching portion of supplying or sealing water. The lower valve base 220 has a joint ring 221, a pivoting salient 222, a plurality of water-outlets 223 and a guiding slot hole 224 set between the water-outlets 223 and the pivoting salient 222. In order to pivot the pivoting salient 222 and the ball connect rod 240, a joint bolt 225 is utilized for passing through and uniting the pivoting hole 226 of the pivoting salient 222 and the pivoting portion 246 of the ball connect rod 240. The valve tappet 240 with the valve stopper 233 and the water-blocking cap 236 are movably disposed inside the valve chamber. The valve stopper 233 is fixed on the valve tappet 230 for obstructing the sealing neck 213. A slide block 234 with a through hole 235, which may linearly move up-and-down along the guiding slot hole 224 in the lower valve base 220, is connected with one end of the valve tappet 230 corresponding to the water-blocking cap 236. The water-blocking cap 236, which is an inner recess shaped cap and able to move in the valve chamber near to the balance opening 214, is set on another end of the valve tappet 230 for radially and movably sealing the balance opening 214 of the upper valve base 210. While supplying water, the water pressure flowed from the water-intake opening 211 forces on the water-blocking cap 236 and the sealing neck 213 so as to lessen water pressure without pushing the sealing neck 213 to open or close improperly.

The ball connect rod 240 is composed of a pivoting rod 241 with a degressive arc end 243 and a float connecting rod 242. The bending angle of the pivoting rod 241 of this embodiment is different from that of the first embodiment. The pivoting rod 241 has a movable pivoting portion 246 that is pivoted with the pivoting salient 222 of the lower valve base 220 by a joint bolt 225. The float connecting rod 242 has a float connecting end 245 for mounting with a float ball 250. The degressive arc end 243 passes through the guiding slot hole 224 and the through hole 235 of the slide block 234, so that the slide block 234 can move up-and-down along the guiding slot hole 224 following the movement of the ball connect rod 240 for leading the valve stopper 233 to block or open the sealing neck 233.

Figure 7:
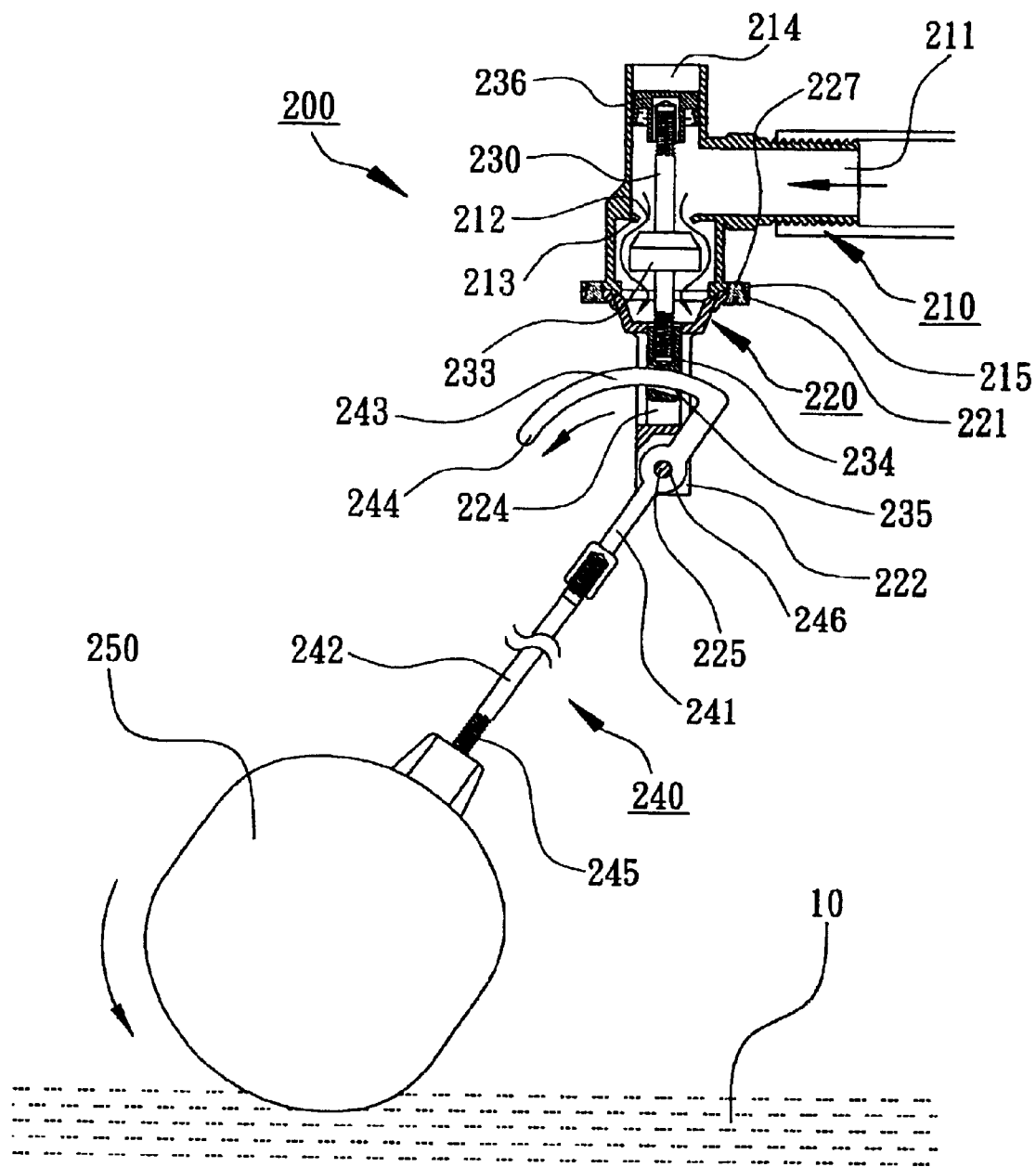
FIG. 7 is a cross sectional view of the water-intake control valve in state of supplying water in accordance the second embodiment of the present invention.
Figure 8:
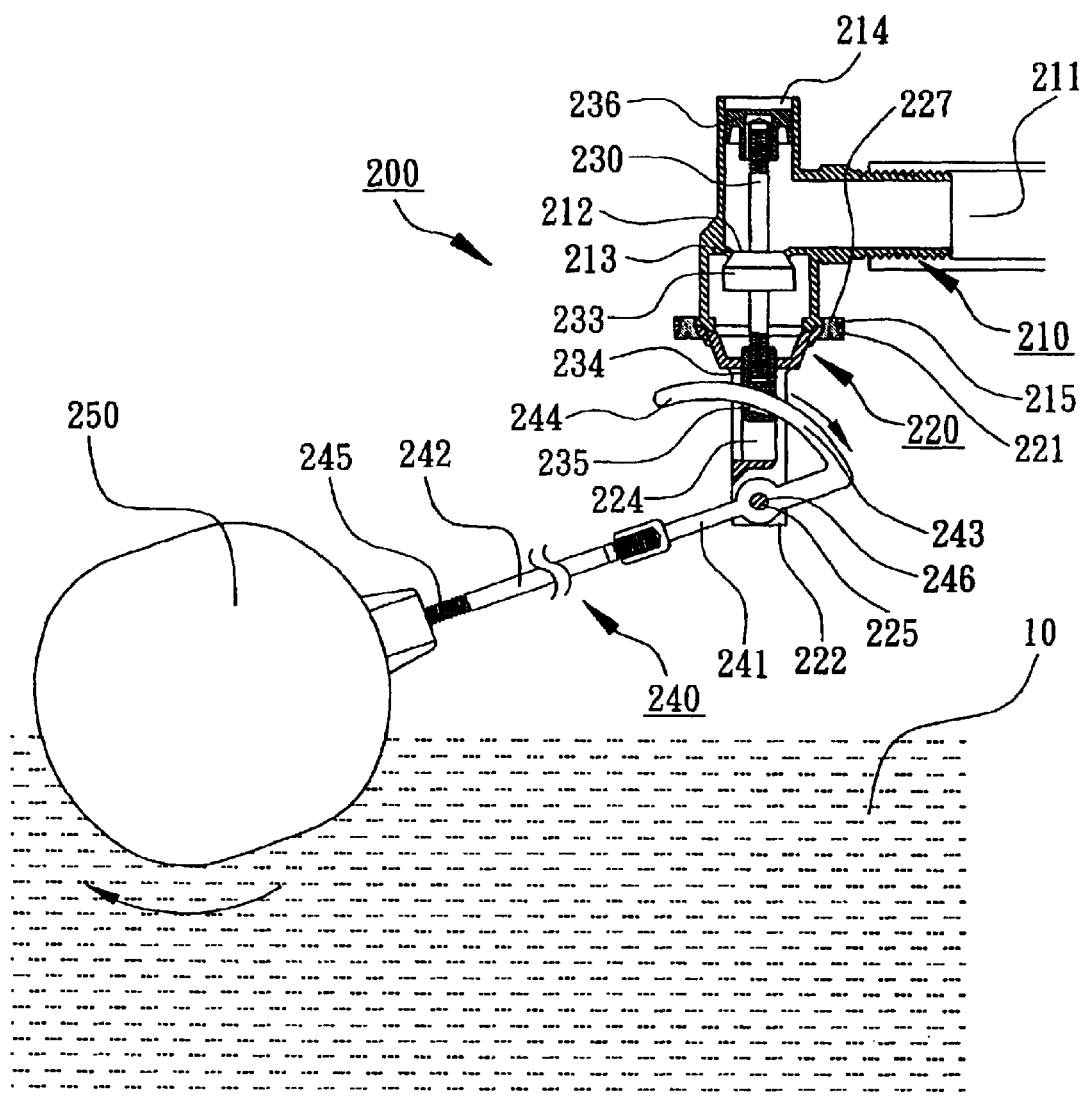
FIG. 8 is a cross sectional view of the water-intake control valve in state of closing water in accordance with the second embodiment of the present invention.

Referring to FIG. 7, when the float ball 250 and the float connecting end 245 of the ball connect rod 240 move downward following the falling water level, the contact portion, in which the degressive arc end 243 of the ball connect rod 240 contacts with the through hole 235 of the slide block 234, moves from the tail end 244 to the inner edge of the degressive arc end 243 for pulling the slide block 234 to fall down, so the valve stopper 233 is pulled away from the sealing neck 213 at the upper valve base 210 to let water flow in and start supplying water. Referring to FIG. 8, when water level 10 ascends to an appropriate height, the float ball 250 moves up and the ball connect rod 240 also moves at the same time. The contacting portion in which the degressive arc end 243 of the ball connect rod 240 contacts with the through hole 235 of the slide block 234, moves from the inner edge of the degressive arc end 243 to the tail end 244 so as to push the slide block 234 moving up, so that the valve stopper 233 led by the valve tappet 230 moves up to seal the sealing neck 213 so as to seal water and stop supplying water. Furthermore, water pressure in the valve chamber can be balanced during supplying water and sealing water due to synchronous movement of the water-blocking cap 236 and the valve stopper 233, thus the valve stopper 233 won't be impacted easily by water pressure resulting in improperly sealing water or supplying water so as to open or close the sealing neck 213 more effectively and certainly.

Besides, the relative position of the sealing neck 113, 213 of this invention is not limited and also can be set on the lower valve base 120, 220. Further, the upper valve base 110, 210 and the lower valve base 120, 220 of this invention are not limited as respective components, which can be a single integrated valve body.

The above description of embodiments of this invention is intended to be illustrated are not limiting. Other embodiments of this invention will be obvious to those skilled in the art in view of the above disclosure.

What is claimed is:

1. A water-intake control valve comprising:
    an upper valve base having a water-intake opening and a water-outtake opening;
    a lower valve base connected to the upper valve base to construct a valve chamber with a sealing neck, wherein the lower valve base has a joint ring, a pivoting salient and a plurality of water-outlets between the joint ring and the pivoting salient, the joint ring is connected with the water-outtake opening of the upper valve base, the pivoting salient has a guiding slot hole;
    a valve tappet movably located inside the valve chamber, wherein the valve tappet is connected with a valve stopper for blocking the sealing neck and is connected with a slide block having a through hole and being slidably located in the guiding slot hole; and
    a ball connect rod having a float connecting end, a degressive arc end and a pivoting portion between the float connecting end and the degressive arc end, wherein the pivoting portion is pivotally connected with the pivoting salient of the lower valve base, the degressive arc end passing through the guiding slot hole and the through hole of the slide block linearly moving the slide block.

2. The water-intake control valve in accordance with claim 1, wherein the degressive arc end of the ball connect rod has a tail end with a gradually enlarging radian.

3. The water-intake control valve in accordance with claim 1, wherein sealing neck is formed in the upper valve base.

4. The water-intake control valve in accordance with claim 1, wherein the upper valve base has an balance opening corresponding to the water-outtake opening, a water-blocking cap is connected with one end of the valve tappet corresponding to the valve stopper for movably sealing the balance opening.

5. The water-intake control valve in accordance with claim 1, wherein the ball connect rod is composed of a float connecting rod and a pivoting rod with the degressive arc end.

6. The water-intake control valve in accordance with claim 1, further comprising a float ball connected with the float connecting end of the ball connect rod.

7. A water-intake control valve comprising:
    a valve body having a valve chamber with a sealing neck, a pivoting salient and a plurality of water-outlets, wherein the pivoting salient has a guiding slot hole;
    a valve tappet movably located inside the valve chamber, wherein the valve tappet is connected with a valve stopper for blocking the sealing neck and is connected with a slide block having a through hole and being slidably located in the guiding slot hole; and a ball connect rod having a float connecting end, a degressive arc end and a pivoting portion between the float connecting end and the degressive arc end, wherein the pivoting portion is pivotally connected with the pivoting salient of the valve base, the degressive arc end passes through the guiding slot hole and the through hole of the slide block linearly moving the slide block.

8. The water-intake control valve in accordance with claim 7, wherein the degressive arc end of the ball connect rod has a tail end with a gradually enlarging radian.

9. The water-intake control valve in accordance with claim 7, wherein the valve body has an balance opening, a water-blocking cap is connected with one end of the valve tappet corresponding to the valve stopper for movably sealing the balance opening.

10. The water-intake control valve in accordance with claim 7, wherein the ball connect rod is composed of a float connecting rod and a pivoting rod with the degressive arc end.

11. The water-intake control valve in accordance with claim 7, further comprising a float ball connected with the float connecting end of the ball connect rod.

* * * * *